US012671096B2

(12) United States Patent
Goto et al.

(10) Patent No.: US 12,671,096 B2
(45) Date of Patent: Jun. 30, 2026

(54) POROUS SILICON OXYCARBIDE COMPOSITE MATERIAL AND METHOD FOR MANUFACTURING SAME

(71) Applicant: DIC Corporation, Tokyo (JP)

(72) Inventors: Yusaku Goto, Chiba (JP); Shinji Kato, Chiba (JP)

(73) Assignee: DIC Corporation, Tokyo (JP)

( * ) Notice: Subject to any disclaimer, the term of this patent is extended or adjusted under 35 U.S.C. 154(b) by 907 days.

(21) Appl. No.: 17/923,342

(22) PCT Filed: Apr. 27, 2021

(86) PCT No.: PCT/JP2021/016726
§ 371 (c)(1),
(2) Date: Nov. 4, 2022

(87) PCT Pub. No.: WO2021/225092
PCT Pub. Date: Nov. 11, 2021

(65) Prior Publication Data

US 2023/0197974 A1 Jun. 22, 2023

(30) Foreign Application Priority Data

May 7, 2020 (JP) ................................ 2020-082098

(51) Int. Cl.
*H01M 4/90* (2006.01)
*H01M 4/86* (2006.01)
*H01M 4/96* (2006.01)

(52) U.S. Cl.
CPC ....... *H01M 4/9075* (2013.01); *H01M 4/8626* (2013.01); *H01M 4/8652* (2013.01); *H01M 4/9058* (2013.01); *H01M 4/96* (2013.01)

(58) Field of Classification Search
CPC ............ H01M 4/9075; H01M 4/8626; H01M 4/8652; H01M 4/9058; H01M 4/96;
(Continued)

(56) References Cited

U.S. PATENT DOCUMENTS 11,127,952 B2 9/2021 Takano et al.
2016/0368776 A1 12/2016 Kizaki et al.
2019/0393503 A1* 12/2019 Takano ................ H01M 4/583

FOREIGN PATENT DOCUMENTS

CN 106256801 A 12/2016
CN 108365184 A 8/2018
(Continued)

OTHER PUBLICATIONS

T. C. de Almeida e Silva et al., " Polymer-derived Co/Ni-SiOC(N) ceramic electrocatalysts for oxygen reduction reaction in fuel cells", Catalysis Science&Technology v9, p. 854-866 (2019).
P.R. Aravind et al., "Porous silicon oxycarbide glasses from hybrid ambigels", Microporous and Mesoporous Materials, v142, p. 511-517 (2011).
(Continued)

*Primary Examiner* — Helen Oi K Conley
(74) *Attorney, Agent, or Firm* — Rimon P.C.

(57) ABSTRACT

A porous silicon oxycarbide composite material comprises a porous silicon oxycarbide having a three-dimensional skeleton structure, and a carbon-containing material supported by the three-dimensional skeleton structure, wherein the porous silicon oxycarbide composite material has a BET specific surface area of 100 $m^2/g$ or more and an electrical conductivity of $1.0\times10^{-6}$ S/cm or more.

21 Claims, 5 Drawing Sheets

(58) Field of Classification Search
CPC ... H01M 8/10; C01P 2004/60; C01P 2006/12; C01P 2006/14; C01P 2006/16; C01P 2006/40; C01B 32/907; C01B 32/977; Y02E 60/50; Y02P 70/50; C04B 35/14; C04B 35/56
See application file for complete search history.

(56) References Cited

FOREIGN PATENT DOCUMENTS

| | | | | |
|---|---|---|---|---|
| CN | 110078058 A | | 8/2019 | |
| JP | 2007-176070 | * | 7/2007 | ............ Y02E 60/50 |
| JP | 2015-160762 A1 | | 9/2015 | |
| KR | 10-1735456 B1 | | 5/2017 | |

OTHER PUBLICATIONS

International Search Report issued in corresponding International Application No. PCT/JP2021/016726, dated Jun. 29, 2021, w/ English Translation (7 pages).
Segatelli, M. G. et al: "Influence of multiwall carbon nanotubes on the structural and morphological features of Si—C—O ceramics derived from a hybrid polymeric precursor", Materials Chemistry and Physics, Elseviers, Switzerland, Taiwan, Republic of China, vol. 124, No. 2-3, Dec. 1, 2010 (Dec. 1, 2010), pp. 1216-1224.
Lu, Kathy: "Porous and high surface area silicon oxycarbide-based materials—A review", Materials Science and Engineering: R: Reports, vol. 97, Nov. 1, 2015 (Nov. 1, 2015), pp. 23-49.
Pauletti, Alberto et al: "A new example of periodic mesoporous SiCO glasses with cubic symmetry stable at 1000°C", Journal of the Seramic Society of Japan, vol. 116, No. 1351, Jan. 1, 2008 (Jan. 1, 2008), pp. 449-453.

* cited by examiner

ADD ORGANIC ALKOXYSILANE TO ACIDIC
AQUEOUS SOLUTION CONTAINING SURFACTANT
AND PH ADJUSTOR AS WELL AS CARBON-
CONTAINING MATERIAL OR ORGANIC POLYMER
TO CAUSE SOL-GEL REACTION, FORMING GEL — STEP (A)

CLEAN GEL WITH ALCOHOL — STEP (B)

DRY CLEANED GEL
TO FORM POROUS SILICON OXYCARBIDE
PRECURSOR — STEP (C)

CALCINE POROUS SILICON OXYCARBIDE
PRECURSOR — STEP (D)

POROUS SILICON OXYCARBIDE COMPOSITE MATERIAL AND METHOD FOR MANUFACTURING SAME

CROSS REFERENCE TO RELATED APPLICATIONS

This application is the U.S. National Phase under 35 U.S.C. § 371 of International Application No. PCT/JP2021/016726, filed on Apr. 27, 2021, which claims the benefit of Japanese Application No. 2020-082098, filed on May 7, 2020, the entire contents of each are hereby incorporated by reference.

TECHNICAL FIELD

The present invention relates to a porous silicon oxycarbide composite material and a method for producing a porous silicon oxycarbide composite material.

BACKGROUND ART

A fuel cell is a device which generates electric power and heat by a chemical reaction of obtaining water from hydrogen and oxygen, and there are several types of fuel cells, such as a phosphoric acid fuel cell (PAFC), a molten carbonate fuel cell (MCFC), a solid oxide fuel cell (SOFC), and a polymer electrolyte fuel cell (PEFC). Of these, the polymer electrolyte fuel cell (PEFC) has such a structure that a solid polymer electrolyte membrane has an anode (fuel electrode) formed on one side thereof and a catalyst layer constituting a cathode (air electrode) formed on another side, and a gas diffusion layer is bonded to the outside surface of each catalyst layer. The catalyst layer is composed of a catalyst in a particle form containing a noble metal, and a catalyst supporting carrier having the catalyst highly dispersed and supported on the surface of nano-sized carrier particles.

Currently, a carbon material having high specific surface area and high electrical conductivity is used as a carrier for supporting a catalyst. However, there is a serious problem in that the catalyst performance in the cathode and anode becomes poor due to corrosion of the carbon carrier and the like. For this reason, the development of a material having high specific surface area and high electrical conductivity as well as excellent durability as a substitute for carbon is strongly desired.

For example, PTL 1 discloses a method for producing a porous silicon oxycarbide ceramic, which comprises (i) mixing a silicon-containing organic compound into a dispersion having dispersed therein a carbon-containing compound and a pore-forming agent to prepare a mixture, (ii) subjecting the obtained mixture to polymerization treatment under conditions at a temperature of 0 to 200° C., and then subjecting the resultant product to primary calcination at a temperature of 200 to 800° C., and pulverizing and classifying the calcined material to prepare a primary-calcined powder, and (iii) subjecting the primary-calcined powder to secondary calcination under conditions at a temperature of 800 to 1,150° C. In this method, the BET specific surface area is 0.5 to 50 $m^2/g$.

Further, the above-mentioned PTL 1 discloses a composite material containing the above-mentioned porous silicon oxycarbide ceramic and an electrically conductive carbon material, such as carbon black. In the composite material disclosed, the content of the electrically conductive carbon material is 1 to 30% by mass, and the composite material can be easily reduced in electrical resistance by such a carbon material.

NTL 1 discloses a method for producing a porous silicon oxycarbide ceramic, in which a silicone resin, a pore-forming agent, a calcination shrinkage controlling agent, and graphite are mixed in an organic solvent, and dried and then the resultant mixed solid is calcined at 1,000° C. In this method, the BET specific surface area is 6.2 to 32.3 $m^2/g$, and the electrical conductivity is $3\times10^{-2}$ to $9\times10^{-2}$ S/cm.

NTL 2 reports a method for producing a porous silicon oxycarbide ceramic, in which, as a silicon-containing organic compound, a bis(trialkoxysilane) compound crosslinked with an alkylene group is used, and polycondensation is allowed to proceed in an alcohol solvent due to a sol-gel reaction, and the resultant porous alkylene-crosslinked polysilsesquioxane gel is calcined at 1,000° C. In this method, the BET specific surface area obtained is 452 $m^2/g$ at the maximum.

CITATION LIST

Patent Literature

PTL 1: JP-A-2015-160762

Non Patent Literature

NTL 1: T. C. de Almeida e Silva et al. Catalysis Science & Technology v9, p 854-866

NTL 2: P. R. Aravind et al. Microporous and Mesoporous Materials v142, p 511-517 (2011).

SUMMARY OF INVENTION

Technical Problem

However, for achieving high efficiency and high power, the electrode for use in a fuel cell needs a carrier for supporting a catalyst, which can satisfy both high specific surface area and high electrical conductivity, and therefore the BET specific surface areas in the above-mentioned PTL 1 and NTL 1 are not satisfactory and must be improved. Further, the above-mentioned PTL 1 merely has a disclosure that the porous silicon oxycarbide ceramic can be reduced in electrical resistance by mixing an electrically conductive carbon material into the ceramic, and has no disclosure of an example of the production of a porous silicon oxycarbide ceramic having an electrically conductive carbon material mixed thereinto, and accordingly, there is no disclosure about quantitative evaluation of an electrical conductivity.

In the above-mentioned NTL 2, there is a disclosure that the porous silicon oxycarbide ceramic has a BET specific surface area as large as 452 $m^2/g$, but this is an example that is achieved using the bis(trialkoxysilane) crosslinked with an alkylene group, which is a special silicon-containing organic compound, and further there is no disclosure or suggestion about an electrical conductivity.

An object of the present invention is to provide a porous silicon oxycarbide composite material having both large BET specific surface area and high electrical conductivity with excellent balance such that the composite material is effective as an electrode material for a fuel cell, and to provide a method for producing a porous silicon oxycarbide composite material using an organic alkoxysilane which is of such a type that it is widely being on the market as an industrial raw material.

Solution to Problem

For achieving the object, in the present invention, a precursor gel is prepared by permitting a carbon-containing material or an organic polymer, which is a carbon source, to be present in a sol-gel reaction of an aqueous solution of organic alkoxysilane conducted in the presence of a surfactant while taking care not to prevent formation of a porous gel, and the prepared precursor gel is calcined, achieving production of a porous silicon oxycarbide composite material having a nanoscale carbon-containing material disposed in a three-dimensional structure skeleton in which a pore structure (mesopores) in the mesoscopic region has developed, and which is porous. Thus, there can be provided a porous silicon oxycarbide composite material having both large BET specific surface area and high electrical conductivity with excellent balance.

Specifically, the present invention provides the following means.

[1] A porous silicon oxycarbide composite material comprising:

- a porous silicon oxycarbide having a three-dimensional skeleton structure, and
- a carbon-containing material supported by the three-dimensional skeleton structure,
- the porous silicon oxycarbide composite material having a BET specific surface area of 100 $m^2/g$ or more, and having an electrical conductivity of $1.0\times10^{-6}$ S/cm or more.

[2] The porous silicon oxycarbide composite material according to item [1] above, which has a total pore volume of 0.5 $cm^3/g$ or more.

[3] The porous silicon oxycarbide composite material according to item [1] or [2] above, which has a pore size of 2 to 200 nm.

[4] The porous silicon oxycarbide composite material according to item [1] above, wherein the content of the carbon-containing material in the porous silicon oxycarbide composite material is 2.5 to 50% by mass.

[5] The porous silicon oxycarbide composite material according to item [4] above, wherein the carbon-containing material comprises one member or two or more members selected from carbon black, a carbon nanofiber, a carbon nanotube, and lowly-crystalline nanocarbon.

[6] The porous silicon oxycarbide composite material according to item [5] above, wherein the primary particles of the carbon-containing material have an average diameter of 10 to 200 nm.

[7] An electrode for use in a fuel cell, the electrode having a layer comprising the porous silicon oxycarbide composite material according to any one of items [1] to [6] above.

[8] A method for producing a porous silicon oxycarbide composite material, comprising the steps of:

- (A) adding an organic alkoxysilane to an acidic aqueous solution containing a surfactant and a pH adjustor to cause a sol-gel reaction of the organic alkoxysilane, forming a gel;
- (B) cleaning the gel with an alcohol;
- (C) drying the cleaned gel to form a porous silicon oxycarbide precursor; and
- (D) calcining the porous silicon oxycarbide precursor to obtain a porous silicon oxycarbide composite material,
- wherein, in the step (A), a carbon-containing material or an organic polymer is further added to the acidic aqueous solution to form a gel containing the carbon-containing material or the organic polymer.

[9] The method for producing a porous silicon oxycarbide composite material according to item [8] above, wherein, in the step (A), the sol-gel reaction is conducted at 25 to 80° C.

[10] The method for producing a porous silicon oxycarbide composite material according to item [8] above, wherein the organic alkoxysilane is represented by the following formula (1) or (2):

$$R^1—SiR^2_x(OR^3)_{3-x} \tag{1}$$

wherein $R^1$ is any one group selected from a methyl group, an ethyl group, a vinyl group, and a phenyl group, $R^2$ represents a methyl group, $R^3$ represents a methyl group or an ethyl group, and integer x is 0 or 1, $$R^4—(SiR^5_y(OR^6)_{3-y})_2 \tag{2}$$

wherein $R^4$ includes any one group selected from a methylene group, an ethylene group, a hexylene group, a vinylene group, a phenylene group, and a biphenylene group, $R^5$ represents a methyl group, $R^6$ represents a methyl group or an ethyl group and integer y is 0 or 1.

[11] The method for producing a porous silicon oxycarbide composite material according to item [8] above, wherein the content of the surfactant in the acidic aqueous solution is 0.1 to 50% by mass.

[12] The method for producing a porous silicon oxycarbide composite material according to item [11] above, wherein the surfactant is a nonionic surfactant and/or a cationic surfactant.

[13] The method for producing a porous silicon oxycarbide composite material according to item [8] above, wherein the content of the pH adjustor in the acidic aqueous solution is 5 to 50% by mass.

[14] The method for producing a porous silicon oxycarbide composite material according to item [12] above, wherein the pH adjustor contains any one selected from urea, ammonia, and sodium hydroxide.

[15] The method for producing a porous silicon oxycarbide composite material according to item [8] above, wherein the mass ratio of the carbon-containing material or organic polymer and the organic alkoxysilane is 2.5 to 50:97.5 to 50.

[16] The method for producing a porous silicon oxycarbide composite material according to item [15] above, wherein the carbon-containing material comprises one member or two or more members selected from carbon black, a carbon nanofiber, a carbon nanotube, and lowly-crystalline nanocarbon.

[17] The method for producing a porous silicon oxycarbide composite material according to item [16] above, wherein primary particles of the carbon-containing material have an average diameter of 10 to 200 nm.

[18] The method for producing a porous silicon oxycarbide composite material according to item [15] above, wherein the organic polymer comprises one member or two or more members selected from a phenolic resin, polystyrene, and polydivinylbenzene.

[19] The method for producing a porous silicon oxycarbide composite material according to item [8] above, wherein, in the step (B), the surfactant is removed from the acidic aqueous solution, and further water in the acidic aqueous solution is replaced by the alcohol.

[20] The method for producing a porous silicon oxycarbide composite material according to item [8] above, wherein, in the step (C), the cleaned gel is dried at room temperature under atmospheric pressure.

[21] The method for producing a porous silicon oxycarbide composite material according to item [8] above, wherein, in the step (D), the porous silicon oxycarbide composite material is calcined at 700 to 1,200° C.

Advantageous Effects of Invention

By the present invention, there can be provided a porous silicon oxycarbide composite material having both large BET specific surface area and high electrical conductivity with excellent balance such that the composite material is effective as an electrode material for a fuel cell.

DESCRIPTION OF EMBODIMENTS

Figure 1:
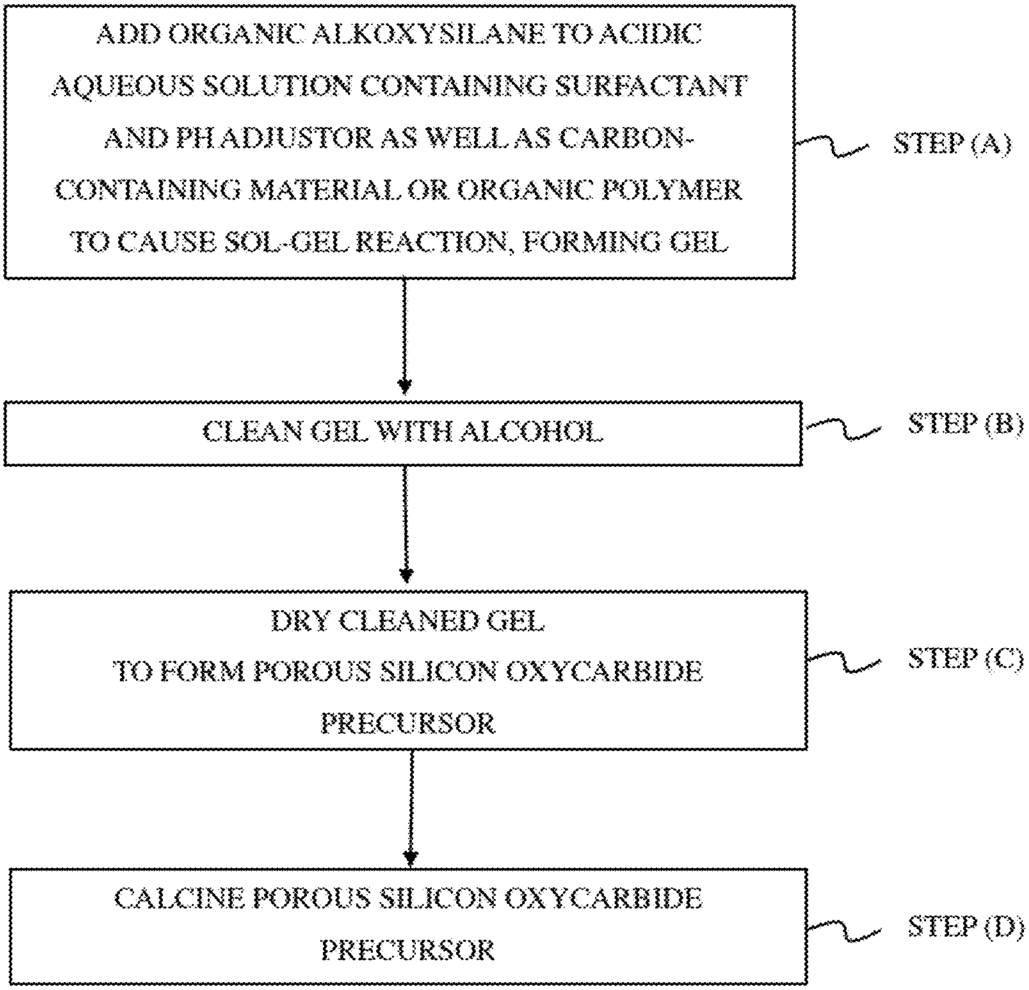
FIG. 1 is a flow chart explaining an example of the method for producing a porous silicon oxycarbide composite material according to an embodiment of the present invention.

<Construction of the Porous Silicon Oxycarbide Composite Material>

The porous silicon oxycarbide composite material of the present embodiment comprises a porous silicon oxycarbide (SiOC) having a three-dimensional skeleton structure, and a carbon-containing material supported by the three-dimensional skeleton structure.

With respect to the form of the porous silicon oxycarbide composite material, there is no particular limitation, but the porous silicon oxycarbide composite material is, for example, in a powder form, a particle form, a fiber form, or a needle-like form, especially preferably in a powder form or a particle form.

When the porous silicon oxycarbide composite material is in a powder form or a particle form, there is no particular limitation with respect to the particle diameter of the porous silicon oxycarbide composite material, but the particle diameter, in terms of a particle diameter $D_{50}$ which is a 50% cumulative particle size in volume-based cumulative particle size distribution, is preferably, for example, 0.1 to 100 μm, more preferably 0.5 to 50 μm, further preferably 1 to 20 μm.

The particle diameter $D_{50}$ of the porous silicon oxycarbide composite material means a value as measured in accordance with JIS Z8825-1:2013, for example, means a particle diameter $D_{50}$ as measured using a laser diffraction particle size distribution measurement apparatus (SALD-7000, manufactured by Shimadzu Corporation).

[Porous Silicon Oxycarbide]

In the porous silicon oxycarbide, a plurality of micropores are individually formed due to the three-dimensional skeleton structure made of a siloxane network, or a plurality of micropores are formed in such a state that part of or all of the micropores are connected together.

The porous silicon oxycarbide in the present embodiment has a BET specific surface area of 100 $m^2/g$ or more, preferably 100 to 1,500 $m^2/g$, more preferably 200 to 1,000 $m^2/g$. When the BET specific surface area of the porous silicon oxycarbide is less than 100 $m^2/g$, the amount of the catalyst particles supported on the surface of the carrier is unsatisfactory, so that, when the porous silicon oxycarbide is used as an electrode for use in a fuel cell, desired properties, such as power output and efficiency, cannot be obtained. On the other hand, when the BET specific surface area of the porous silicon oxycarbide is 1,500 $m^2/g$ or less, the ratio of the mesopores suitable for supporting a catalyst is increased, making it possible to further improve the utilization of the catalyst particles.

The porous silicon oxycarbide preferably has a total pore volume of 0.5 $cm^3/g$ or more, more preferably 0.5 to 3.0 $cm^3/g$, further preferably 0.6 to 2.0 $cm^3/g$. When the total pore volume of the porous silicon oxycarbide is 0.5 $cm^3/g$ or more, the reacting gas and electrolyte can easily flow through the catalyst layer, making it possible to improve the catalytic efficiency. On the other hand, when the total pore volume of the porous silicon oxycarbide is 3.0 $cm^3/g$ or less, excellent productivity can be achieved.

The porous silicon oxycarbide preferably has a pore size of 2 to 200 nm, more preferably 5 to 150 nm, further preferably 10 to 100 nm. When the pore size of the porous silicon oxycarbide is 2 to 200 nm, the reacting gas and electrolyte can easily flow through the catalyst layer, making it possible to improve the catalytic efficiency. Particularly, when the pore size of the porous silicon oxycarbide is less than 2 nm, supply of the reacting gas and electrolyte to the supported catalyst particles is difficult, so that the utilization of the catalyst particles is markedly reduced.

The BET specific surface area, total pore volume, and pore size of the porous silicon oxycarbide can be determined as values measured by a gas adsorption method, which mean values determined by, for example, using an isovolumetric method, while changing the relative pressure in the adsorption isotherm, causing adsorption of a non-corrosive gas, such as nitrogen or argon, and making a calculation from the adsorption amount and condensation of the non-corrosive gas.

[Carbon-Containing Material]

The content of the carbon-containing material in the porous silicon oxycarbide composite material is preferably 2.5 to 50% by mass, more preferably 3 to 30% by mass, further preferably 5 to 20% by mass. When the content of the carbon-containing material is higher, higher electrical conductivity can be advantageously achieved, but, on the other hand, when the content of the carbon-containing material is too high, corrosion of the carbon-containing material and the like are likely to occur, so that the durability in the catalyst cycle becomes poor.

The content of the carbon-containing material in the porous silicon oxycarbide composite material means a value as measured by, for example, using specifying a ratio of the contained elements by an elemental analysis, a $^{29}$Si-NMR spectrum, and a thermogravimetric differential thermal analysis (TG-DTA) in air in combination.

With respect to the carbon-containing material, there is no particular limitation, but, for example, the carbon-containing material can comprise one member or two or more members selected from carbon black, a carbon nanofiber, a carbon nanotube, and lowly-crystalline nanocarbon. Of these, in view of achieving high electrical conductivity, and from the viewpoint of the productivity, the carbon-containing material is preferably carbon black.

When the carbon-containing material comprises carbon black, the primary particles of the carbon-containing material preferably have an average diameter of 10 to 200 nm, more preferably 20 to 100 nm, further preferably 30 to 50 nm. When the primary particles of the carbon-containing material have an average diameter of 10 to 200 nm, excellent electrical conductivity can be achieved.

When the carbon-containing material comprises a carbon nanofiber or a carbon nanotube, the carbon-containing material preferably has an average diameter of 10 to 200 nm, and the carbon-containing material preferably has a length of 1 to 20 μm.

The form and size of the carbon-containing material supported in the porous silicon oxycarbide composite material can be actually measured from, for example, observation using a transmission electron microscope or a scanning electron microscope. Further, the average diameter of the primary particles can be determined from, for example, a microscope image by using software for image analysis particle size distribution measurement.

[Properties of Porous Silicon Oxycarbide]

The porous silicon oxycarbide has an electrical conductivity of $1.0\times10^{-6}$ S/cm or more, preferably $1.0\times10^{-4}$ to $1.0\times10^{2}$ S/cm, more preferably $1.0\times10^{-3}$ to 10 S/cm. When the electrical conductivity of the porous silicon oxycarbide is higher, excellent electrode catalyst for fuel cell can be provided, but, when the amount of the supported carbon-containing material which contributes to an improvement of the electrical conductivity is too high, corrosion of the carbon component is likely to proceed in the catalyst cycle, so that the durability may become poor.

<Method for Producing a Porous Silicon Oxycarbide Composite Material>

The method for producing a porous silicon oxycarbide composite material of the present embodiment has, as shown in FIG. 1, the gel-forming step (step (A)), cleaning step (step (B)), porous silicon oxycarbide precursor-forming step (step (C)), and calcination step (step (D)). An additional step other than the above-mentioned steps may be provided before or after the individual step as long as the porous silicon oxycarbide composite material of the present embodiment can be obtained.

[Step (A)]

In the step (A), for example, an organic alkoxysilane is added to an acidic aqueous solution containing a surfactant and a pH adjustor to cause a sol-gel reaction of the organic alkoxysilane, forming a gel. For example, hydrolyzation of the hydrolyzable organic alkoxysilane forms a hydrolyzate, and further the reaction system is increased in pH to cause a polycondensation reaction of the organic alkoxysilane, obtaining a polysilsesquioxane. The pH suitable for the polycondensation reaction varies depending on the isoelectric point of the organic alkoxysilane used, but, when the pH is too high, the reaction efficiency is likely to become poor, making it difficult to form a gel. The sol-gel reaction is preferably conducted at 25 to 80° C., more preferably at 30 to 70° C., further preferably at 40 to 60° C. Thus, a polysilsesquioxane can be obtained in the form of a wet gel containing therein water as a solvent.

The content of the surfactant in the acidic aqueous solution is preferably 0.1 to 50% by mass, more preferably 0.5 to 35% by mass, further preferably 2 to 15% by mass.

With respect to the surfactant, there is no particular limitation, but, for example, there can be mentioned a nonionic surfactant and/or a cationic surfactant. By appropriately selecting any one or both of a nonionic surfactant and a cationic surfactant and using it or them as the surfactant, a desired BET specific surface area and pore size can be obtained. Examples of nonionic surfactants include those of a polyethylene glycol type (an ether type and an ester-ether type) and those of a polyhydric alcohol type. Examples of polyethylene glycol-type nonionic surfactants include those of a Pluronic (registered trademark) type. Examples of cationic surfactants include those of an amine salt type and those of a quaternary ammonium salt type. When the content of the surfactant in the acidic aqueous solution is 0.1 to 50% by mass, a porous gel having such large BET specific surface area that mesopores have developed can be formed.

The content of the pH adjustor in the acidic aqueous solution is preferably 5 to 50% by mass, more preferably 5.5 to 35% by mass, further preferably 6 to 23% by mass. When the content of the pH adjustor in the acidic aqueous solution is 5 to 50% by mass, a porous polysilsesquioxane gel having high skeletal strength and flexibility can be formed.

With respect to the pH adjustor, there is no particular limitation, but, for example, there can be mentioned a substance containing any one selected from urea, ammonia, and sodium hydroxide.

With respect to the acidic aqueous solution, there is no particular limitation, but there can be mentioned an aqueous solution of hydrochloric acid, nitric acid, acetic acid, or the like.

The organic alkoxysilane is preferably represented by the formula (1) or (2) below. By using the organic alkoxysilane represented by the formula (1) or (2) below, a porous silicon oxycarbide having a desired three-dimensional skeleton structure can be easily formed.

$$R^1\text{-}SiR^2_x(OR^3)_{3-x} \quad (1)$$

Wherein $R^1$ is any one group selected from a methyl group, an ethyl group, a vinyl group, and a phenyl group, $R^2$ represents a methyl group, $R^3$ represents a methyl group or an ethyl group, and integer x is 0 or 1.

$$R^4\text{-}(SiR^5_y(OR^6)_{3-y})_2 \quad (2)$$

Wherein $R^4$ includes any one group selected from a methylene group, an ethylene group, a hexylene group, a vinylene group, a phenylene group, and a biphenylene group, $R^5$ represents a methyl group, $R^6$ represents a methyl group or an ethyl group, and integer y is 0 or 1.

Specific examples of the organic alkoxysilanes represented by the formula (1) above include methyltrimethoxysilane, methyltriethoxysilane, dimethyldimethoxysilane, ethyltrimethoxysilane, ethyltriethoxysilane, methylethyldimethoxysilane, vinyltrimethoxysilane, vinyltriethoxysilane, methylvinyldimethoxysilane, phenyltrimethoxysilane, phenyltriethoxysilane, and methylphenyldimethoxysilane. Further, specific examples of the organic alkoxysilanes represented by the formula (2) above include bis(trimethoxysilyl) methane, bis(triethoxysilyl)methane, bis (methyldimethoxysilyl)methane, bis(methyldiethoxysilyl) methane, 1,2-bis(trimethoxysilyl)ethane, 1,2-bis (triethoxysilyl)ethane, 1,2-bis(methyldimethoxysilyl) ethane, 1,2-bis(methyldiethoxysilyl)ethane, 1,6-bis (trimethoxysilyl)hexane, 1,6-bis(triethoxysilyl)hexane, 1,6-bis(methyldimethoxysilyl)hexane, 1,6-bis (methyldiethoxysilyl)hexane, 1,2-bis(trimethoxysilyl) ethene, 1,2-bis(triethoxysilyl)ethene, 1,2-bis (methyldimethoxysilyl)ethene, 1,2-bis(methyldiethoxysilyl) ethene, 1,4-bis(trimethoxysilyl)benzene, 1,4-bis (triethoxysilyl)benzene, 1,4-bis(methyldimethoxysilyl) benzene, 1,4-bis(methyldiethoxysilyl)benzene, 4,4'-bis (trimethoxysilyl)biphenyl, 4,4'-bis(triethoxysilyl)biphenyl, 4,4'-bis(methyldimethoxysilyl)biphenyl, and 4,4'-bis(methyldiethoxysilyl)biphenyl. With respect to the above-mentioned ethene derivatives, there are cis/trans geometrical isomers, but any of the isomers can be used.

In the step (A), a carbon-containing material or an organic polymer is further added to the acidic aqueous solution to form a gel containing the carbon-containing material or the organic polymer. By adding the carbon-containing compound or the organic polymer during a sol-gel reaction of the alkoxysilane, the nanoscale carbon-containing material can be disposed in a porous three-dimensional structure skeleton after the precursor formed in the step (C) is calcined in the step (D), making it possible to impart excellent electrical conductivity to the porous silicon oxycarbide which is inherently an insulator. The organic polymer undergoes pyrolysis due to calcination conducted in the step (D) to form lowly-crystalline nanocarbon, which is supported in the porous silicon oxycarbide, so that electrical conductivity can be imparted to the porous silicon oxycarbide.

In the step (A), it is preferred that the carbon-containing material or the organic polymer is added to the acidic aqueous solution so that the mass ratio of the carbon-containing material or the organic polymer and the organic alkoxysilane becomes 2.5 to 50:97.5 to 50. Further, the mass ratio of the carbon-containing material or the organic polymer and the organic alkoxysilane is more preferably 3 to 30:70 to 97, further preferably 5 to 20:80 to 95. When the mass ratio of the carbon-containing material or the organic polymer and the organic alkoxysilane is a value in the above range, both larger BET specific surface area and higher electrical conductivity can be achieved. When the amount of the carbon-containing material or the organic polymer added is too large, separation from the sol-gel reaction system disadvantageously proceeds, making it difficult to form a gel composed of polysilsesquioxane.

With respect to the carbon-containing material, there is no particular limitation, but, for example, the carbon-containing material can comprise one member or two or more members selected from carbon black, a carbon nanofiber, a carbon nanotube, and lowly-crystalline nanocarbon. Of these, in view of achieving high electrical conductivity, and from the viewpoint of the productivity, the carbon-containing material is preferably carbon black.

With respect to the organic polymer, there is no particular limitation, but, for example, the organic polymer can comprise one member or two or more members selected from a phenolic resin, polystyrene, and polydivinylbenzene.

[Step (B)]

In the step (B), the gel obtained in the step (A) above is cleaned with an alcohol. With respect to the alcohol used for cleaning, there is no particular limitation, but, for example, there can be mentioned methanol, ethanol, 1-propanol, and 2-propanol. By cleaning with an alcohol, the unnecessary surfactant is removed from the acidic aqueous solution, and further water in the acidic aqueous solution can be replaced by the alcohol. After cleaning with the alcohol, further the alcohol may be replaced by a hydrocarbon solvent, such as hexane or heptane. In the present step (B), water which is a high surface-tension solvent is replaced by an alcohol or hydrocarbon solvent which is a low surface-tension solvent, and, in the below-mentioned step (C) which is the drying step at ordinary room temperature under atmospheric pressure, shrinkage of the siloxane network can be suppressed, facilitating formation of a porous gel structure.

[Step (C)]

In the step (C), the cleaned gel is dried to form a porous silicon oxycarbide precursor. Examples of drying methods in the step (C) include a method in which the gel is subjected to supercritical drying using carbon dioxide at 80° C. under 14 MPa, a method in which the gel is dried at room temperature under atmospheric pressure, and a method in which the gel is subjected to vacuum drying at 20 to 80° C. Of these, preferred is a method in which the gel is dried at room temperature under atmospheric pressure in view of the low production cost and obtaining a porous silicon oxycarbide precursor having such high density that mesopores have developed when a polysilsesquioxane having high skeletal strength and flexibility is formed.

[Step (D)]

In the step (D), the porous silicon oxycarbide precursor containing the above-mentioned carbon-containing material or organic polymer is calcined to obtain a porous silicon oxycarbide composite material. In this step, calcination supplies carbon atoms from the organic group of the polysilsesquioxane to form a silicon oxycarbide skeleton, and, on the other hand, carbon atoms are also supplied to the skeleton from the nanoscale carbon-containing material or the organic polymer dispersed in the gel. The organic polymer undergoes pyrolysis due to calcination to form lowly-crystalline nanocarbon, which is supported in the porous silicon oxycarbide.

The calcination can be conducted by a method which is known and commonly used, and is not particularly limited, but, for example, calcination is conducted by increasing the temperature at 5° C. per minute in an inert gas atmosphere and maintaining the highest temperature in the temperature increase for a predetermined time. The highest temperature for calcination is preferably 700 to 1,200° C., further preferably 750 to 1,100° C., especially preferably 800 to 1,000° C. The time of maintaining the highest temperature may be appropriately selected using an effective time for obtaining the porous silicon oxycarbide composite material as a yardstick, and, as an example, the time is preferably 5 minutes to 16 hours, further preferably 10 minutes to 10 hours, especially preferably 30 minutes to 3 hours. The calcination may be conducted in two or more stages. Specifically, on the first stage, calcination is conducted at a temperature lower than the highest temperature for a predetermined time, and then the temperature is increased and calcination can be conducted at that temperature. The calcination may be calcination under atmospheric pressure.

Examples of inert gases include nitrogen, helium, and argon. The inert gas may contain a reducing gas, such as hydrogen gas.

The calcination can be conducted using a carbonization furnace of a fixed bed or fluidized bed system, and, with respect to the heating system and type of the carbonization furnace, there is no particular limitation as long as it is a furnace having a function such that the temperature can be increased to a predetermined temperature. Examples of carbonization furnaces include a Riedhammer furnace, a tunnel furnace, and a single furnace.

In the present step (D), calcination can be conducted in such a manner that a carbon-containing material or an organic polymer is further mixed into the porous silicon oxycarbide precursor and the resultant mixture is calcined. When an organic polymer is mixed into the porous silicon oxycarbide precursor in the step (D), as mixed in the step (A), the organic polymer undergoes pyrolysis due to calcination to form lowly-crystalline nanocarbon, which is supported in the porous silicon oxycarbide.

EXAMPLES

Hereinbelow, Examples of the present invention will be described. The following Examples should not be construed as limiting the scope of the invention.

Example 1

Figure 2:
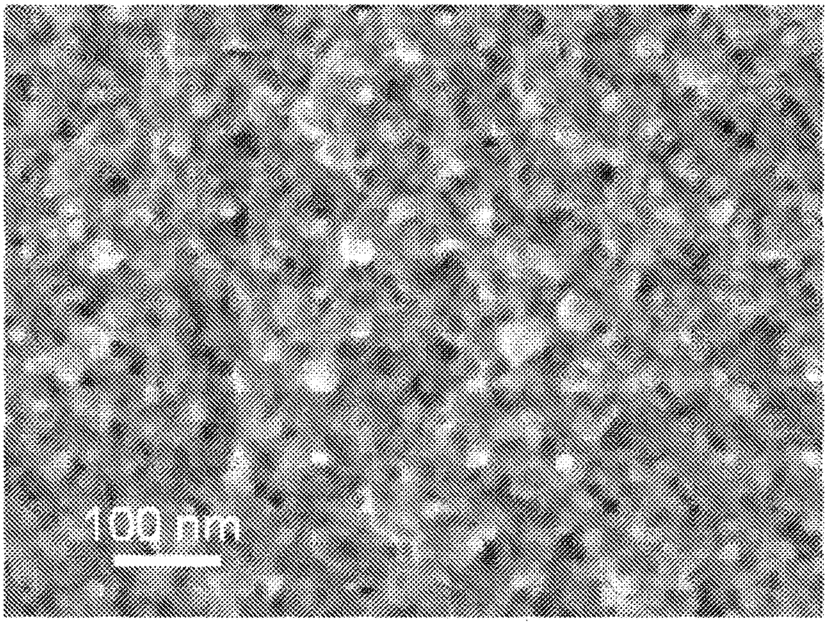
FIG. 2 is a scanning electron microscope image of the porous silicon oxycarbide composite material in Example 1.
Figure 3:
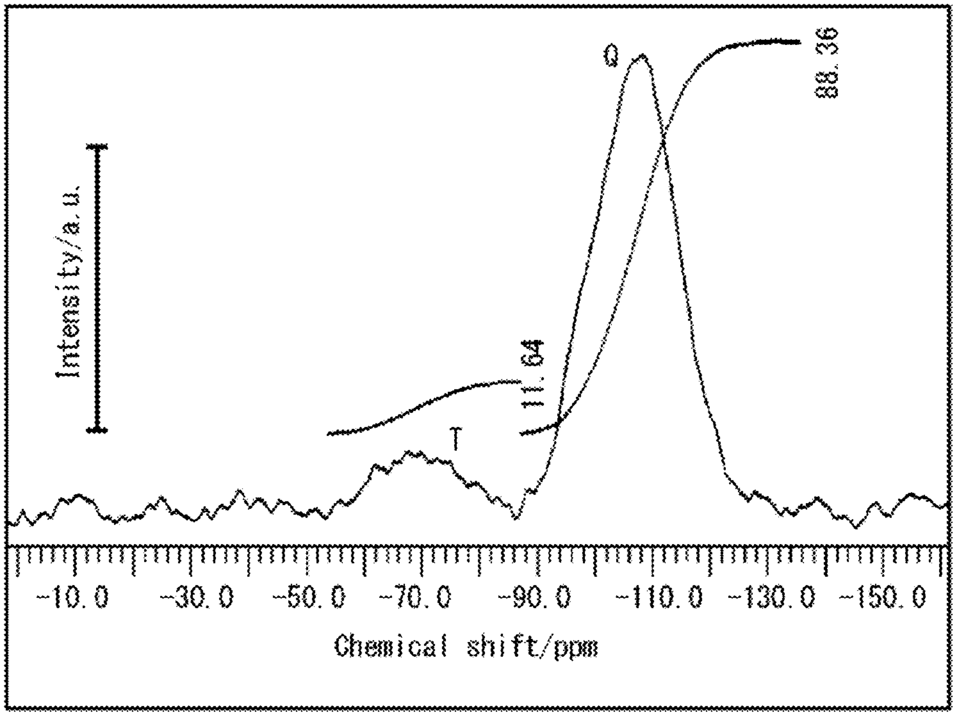
FIG. 3 is a $^{29}$Si-NMR spectrum of the porous silicon oxycarbide composite material in Example 1.

6 g of a 5 mM aqueous solution of acetic acid (manufactured by Kanto Chemical Co., Inc.), 0.8 g of Pluronic (registered trademark) F-127 (manufactured by BASF AG), 0.5 g of urea (manufactured by Kanto Chemical Co., Inc.), and 0.24 g of ketjen black (product name "EC-600", manufactured by Lion Specialty Chemicals Co., Ltd.) were placed in a vial and stirred at room temperature for 10 minutes. 5 g of methyltrimethoxysilane (manufactured by Kanto Chemical Co., Inc.) was added to the vial, and the resultant mixture was stirred at room temperature for 30 minutes. Then, the mixture was subjected to reaction at 60° C. for 4 days, obtaining a wet gel. The obtained wet gel was cleaned with methanol (manufactured by Kanto Chemical Co., Inc.), and dried at room temperature under atmospheric pressure for 3 days, and then further dried at 80° C. under atmospheric pressure for 6 hours, obtaining 3.5 g of a porous silicon oxycarbide precursor. 1 g of the obtained porous silicon oxycarbide precursor was charged into a tube furnace, and subjected to calcination in a nitrogen gas atmosphere under conditions such that the temperature was increased to 1,000° C. at a temperature increase rate of 10° C./minute and that temperature was maintained for 2 hours, and then 0.8 g of the resultant solid material was pulverized by a paint conditioner to obtain a powder having a particle diameter ($D_{50}$) of 1 μm. A scanning electron microscope image of the obtained powder is shown in FIG. 2. Further, as seen from the $^{29}$Si-NMR spectrum of the powder shown in FIG. 3, the presence of Si bonded to C was detected, and it was found that a porous silicon oxycarbide composite material was formed.

Example 2

3.5 g of a porous silicon oxycarbide precursor was obtained in substantially the same manner as in Example 1 except that the amount of Pluronic F-127 was changed to 1.0 g, and that the amount of the urea was changed to 0.4 g, and then subjected to the calcination step, obtaining a porous silicon oxycarbide composite material at a yield of 76%.

Example 3

3.4 g of a porous silicon oxycarbide precursor was obtained in substantially the same manner as in Example 1 except that the amount of Pluronic F-127 was changed to 0.65 g, and then subjected to the calcination step, obtaining a porous silicon oxycarbide composite material at a yield of 75%.

Example 4

3.3 g of a porous silicon oxycarbide precursor was obtained in substantially the same manner as in Example 1 except that the amount of Pluronic F-127 was changed to 0.40 g, and then subjected to the calcination step, obtaining a porous silicon oxycarbide composite material at a yield of 74%.

Example 5

3.4 g of a porous silicon oxycarbide precursor was obtained in substantially the same manner as in Example 1 except that the amount of Pluronic F-127 was changed to 0.37 g, and then subjected to the calcination step, obtaining a porous silicon oxycarbide composite material at a yield of 72%.

Example 6

3.5 g of a porous silicon oxycarbide precursor was obtained in substantially the same manner as in Example 1 except that the amount of Pluronic F-127 was changed to 0.34 g, and that the amount of the urea was changed to 6 g, and then subjected to the calcination step, obtaining a porous silicon oxycarbide composite material at a yield of 78%.

Example 7

3.5 g of a porous silicon oxycarbide precursor was obtained in substantially the same manner as in Example 1 except that the amount of the 5 mM aqueous solution of acetic acid was changed to 10 g, that the amount of the urea was changed to 6 g, and that Pluronic F-127 was changed to 0.40 g of cetyltrimethylammonium chloride (manufactured by Tokyo Chemical Industry Co., Ltd.), and then subjected to the calcination step, obtaining a porous silicon oxycarbide composite material at a yield of 77%.

Example 8

3.2 g of a porous silicon oxycarbide precursor was obtained in substantially the same manner as in Example 7 except that the amount of the urea was changed to 3 g, and then subjected to the calcination step, obtaining a porous silicon oxycarbide composite material at a yield of 71%.

Example 9

3.1 g of a porous silicon oxycarbide precursor was obtained in substantially the same manner as in Example 8 except that the amount of the cetyltrimethylammonium chloride was changed to 0.06 g, and then subjected to the calcination step, obtaining a porous silicon oxycarbide composite material at a yield of 76%.

Example 10

3.6 g of a porous silicon oxycarbide precursor was obtained in substantially the same manner as in Example 8 except that the ketjen black was changed to 1.5 g of a phenolic resin (product name "PHENOLITE IF-3300", manufactured by DIC Corporation), and then subjected to the calcination step, obtaining a porous silicon oxycarbide composite material at a yield of 65%.

Example 11

3.5 g of a porous silicon oxycarbide precursor was obtained in substantially the same manner as in Example 10 except that the amount of the phenolic resin was changed to 2.5 g, and then subjected to the calcination step, obtaining a porous silicon oxycarbide composite material at a yield of 67%.

Example 12

3.2 g of a porous silicon oxycarbide precursor was obtained in substantially the same manner as in Example 10 except that the phenolic resin was changed to 0.24 g of carbon nanotube (product name "Flotube 7000", manufactured by Cnano Technology, Ltd.), and then subjected to the calcination step, obtaining a porous silicon oxycarbide composite material at a yield of 43%. ged to 0.24 g of carbon nanotube (product name "Flotube 7000", manufactured by Cnano Technology, Ltd.), and then subjected to the calcination step, obtaining a porous silicon oxycarbide composite material at a yield of 43%.

Example 13

3.5 g of a porous silicon oxycarbide precursor was obtained in substantially the same manner as in Example 8 except that the amount of the ketjen black was changed to 0.15 g, and then subjected to the calcination step, obtaining a porous silicon oxycarbide composite material at a yield of 70%.

Example 14

3.4 g of a porous silicon oxycarbide precursor was obtained in substantially the same manner as in Example 8 except that the amount of the ketjen black was changed to 0.4 g, and then subjected to the calcination step, obtaining a porous silicon oxycarbide composite material at a yield of 78%.

Example 15

3.5 g of a porous silicon oxycarbide precursor was obtained in substantially the same manner as in Example 8 except that the amount of the methyltrimethoxysilane was changed to 4 g, and that 1 g of vinyltrimethoxysilane (manufactured by Kanto Chemical Co., Inc.) was used, and then subjected to the calcination step, obtaining a porous silicon oxycarbide composite material at a yield of 79%.

Example 16

3.4 g of a porous silicon oxycarbide precursor was obtained in substantially the same manner as in Example 15 except that the vinyltrimethoxysilane was changed to 1 g of phenyltrimethoxysilane (manufactured by Kanto Chemical Co., Inc.), and then subjected to the calcination step, obtaining a porous silicon oxycarbide composite material at a yield of 80%.

Example 17

3.5 g of a porous silicon oxycarbide precursor was obtained in substantially the same manner as in Example 1 except that calcination was conducted at 700° C., and then subjected to the calcination step, obtaining a porous silicon oxycarbide composite material at a yield of 77%.

Example 18

5 g of a 5 mM aqueous solution of nitric acid (manufactured by Kanto Chemical Co., Inc.), 5 g of 1,2-bis(methyldiethoxysilyl)ethane (manufactured by Gelest Inc.), and 0.24 g of ketjen black were placed in a vial and stirred at room temperature for 30 minutes. 3 g of polyoxyethylene-2-ethylhexyl ether (Nonion EH-208, manufactured by NOF Corporation) was added to the vial, and the resultant mixture was stirred for 3 minutes, and 2 g of 0.6 M tetraethylammonium hydroxide (manufactured by Tokyo Chemical Industry Co., Ltd.) was added and the resultant mixture was stirred at room temperature for 30 seconds. Then, the mixture was subjected to reaction at 80° C. for 4 days, obtaining a wet gel. The obtained wet gel was cleaned with methanol, and dried at room temperature under atmospheric pressure for 3 days, and then further dried at 80° C. under atmospheric pressure for 6 hours, obtaining 3.0 g of a porous silicon oxycarbide precursor. 1 g of the obtained porous silicon oxycarbide precursor was subjected to calcination in a nitrogen gas atmosphere under conditions such that the temperature was increased to 1,000° C. at a temperature increase rate of 10° C./minute and that temperature was maintained for 2 hours, and then 0.7 g of the resultant solid material was pulverized by a paint conditioner to obtain a porous silicon oxycarbide composite material having a particle diameter ($D_{50}$) of 1 μm.

Example 19

5 g of 1,2-bis(methyldiethoxysilyl)ethene (manufactured by Gelest Inc.; trans isomer), 0.24 g of ketjen black, and 5 g of polyoxyethylene-2-ethylhexyl ether were placed in a vial and stirred at room temperature for 30 minutes. 5 g of a 5 mM aqueous solution of nitric acid was added to the vial, and the resultant mixture was stirred for 10 minutes, and 5 g of 0.6 M tetraethylammonium hydroxide was added and the resultant mixture was stirred at room temperature for 30 seconds. Substantially the same procedure as in Example 18 except the above procedure was conducted to obtain 2.9 g of a porous silicon oxycarbide precursor, and then the precursor was subjected to the calcination step, obtaining a porous silicon oxycarbide composite material at a yield of 79%.

Example 20

1.8 g of a 3 M aqueous solution of hydrochloric acid (manufactured by Kanto Chemical Co., Inc.), 7.5 g of isopropyl alcohol (manufactured by Kanto Chemical Co., Inc.), 5 g of 1,2-bis(triethoxysilyl)ethane (manufactured by Tokyo Chemical Industry Co., Ltd.), 0.24 g of ketjen black, and 0.01 g of polyoxyethylene-2-ethylhexyl ether were placed in a vial and stirred at room temperature for 10 minutes. 3.5 g of 13.4 M ammonium hydroxide (manufactured by Kanto Chemical Co., Inc.) was added to the vial, and the resultant mixture was stirred at room temperature for 30 minutes. Then, the mixture was subjected to reaction at 60° C. for 4 days, obtaining a wet gel. The obtained wet gel was cleaned with methanol, and dried at room temperature under atmospheric pressure for 3 days, and then further dried at 80° C. under atmospheric pressure for 6 hours, obtaining 2.4 g of a porous silicon oxycarbide precursor. 1 g of the obtained porous silicon oxycarbide precursor was subjected to calcination in a nitrogen gas atmosphere under conditions such that the temperature was increased to 1,000° C. at a temperature increase rate of 10° C./minute and that temperature was maintained for 2 hours, and then 0.7 g of the resultant solid material was pulverized by a paint conditioner to obtain a porous silicon oxycarbide composite material having a particle diameter ($D_{50}$) of 1 μm.

Comparative Example 1

In a flow of Ar, 18.6 g of a novolak phenolic resin (PSM4261, manufactured by Gunei Chemical Industry Co., Ltd.) was dissolved in 60 ml of diethylene glycol (manufactured by Tokyo Chemical Industry Co., Ltd.; molecular weight: 106), which is a pore-forming agent, and, while stirring, 108.6 g of tetraethoxysilane (manufactured by Tokyo Chemical Industry Co., Ltd.) was dropwise added to the resultant solution. Then, 4.68 g of p-toluenesulfonic acid (manufactured by Tokyo Chemical Industry Co., Ltd.) was added as an acid catalyst to initiate polymerization. The resultant mixture was heated at a temperature increase rate of 25° C./hour to 115° C. which is a temperature around the boiling point of the solution, and then heated under reflux at that temperature for 20 hours. Then, the temperature of the mixture was increased to 200° C., and the mixture was subjected to heat-curing as well as desolvation treatment by maintaining it in a vacuum for 24 hours. The resultant polymer was subjected to primary calcination by maintaining it in an Ar gas atmosphere at 600° C. for one hour. Then, the resultant material was subjected to secondary calcination by maintaining it in an Ar gas atmosphere at a temperature of 1,000° C. for 3 hours, obtaining an intended porous silicon oxycarbide.

Comparative Example 2

3.0 g of a porous silicon oxycarbide precursor was obtained in substantially the same manner as in Example 1 except that urea was not used, and then subjected to the calcination step, obtaining a porous silicon oxycarbide composite material at a yield of 35%.

Comparative Example 3

3.5 g of a porous silicon oxycarbide precursor was obtained in substantially the same manner as in Example 1 except that the amount of the ketjen black charged was changed to 0.10 g, and then subjected to the calcination step, obtaining a porous silicon oxycarbide composite material at a yield of 69%.

With respect to Examples 1 to 20 and Comparative Examples 1 to 3 above, the measurement was conducted in accordance with the methods described below.

[Measurement of a BET Specific Surface Area, a Pore Volume, and a Pore Size]

0.04 g of the porous silicon oxycarbide composite material or porous silicon oxycarbide powder was weighed and placed in a sample tube, and subjected to pretreatment by vacuum drying at 100° C. for 6 hours. After the pretreatment, using a specific surface area/pore distribution apparatus (apparatus name "BELSORP-miniII", manufactured by MicrotracBEL Corp.), nitrogen was adsorbed on the sample at −196° C. while changing the relative pressure.

[Measurement of an Electrical Conductivity]

The porous silicon oxycarbide composite material or porous silicon oxycarbide powder was introduced into a powder resistivity measurement system (apparatus name "MCP-PD51", manufactured by Mitsubishi Chemical Analytech Co., Ltd.), and the sample was pressurized using the attached hydraulic pump, and, after the pressure had reached 12 kN, a resistivity was measured by a resistivity meter (apparatus name "Loresta GX", manufactured by Mitsubishi Chemical Analytech Co., Ltd.), and an electrical conductivity was calculated from the resistivity using the formula shown below. The results of the measurement are shown in Table 1.

Electrical conductivity (S/cm)=(Powder resistivity (Ω·cm))$^{-1}$

TABLE 1

| | Specific surface area ($m^2$/g) | Pore volume ($cm^3$/g) | Pore size (nm) | Electrical conductivity (S/cm) |
|---|---|---|---|---|
| Example 1 | 280 | 1.6 | 20 | $4.2 \times 10^{-3}$ |
| Example 2 | 250 | 1.5 | 40 | $2.5 \times 10^{-3}$ |
| Example 3 | 230 | 1.2 | 100 | $1.2 \times 10^{-3}$ |
| Example 4 | 225 | 1 | 150 | $1.2 \times 10^{-3}$ |
| Example 5 | 210 | 1 | 200 | $1.1 \times 10^{-3}$ |
| Example 6 | 240 | 1.1 | 15 | $2.2 \times 10^{-3}$ |
| Example 7 | 380 | 0.8 | 5 | $2.5 \times 10^{-3}$ |
| Example 8 | 330 | 0.7 | 10 | $2.4 \times 10^{-3}$ |
| Example 9 | 300 | 0.5 | 50 | $1.1 \times 10^{-3}$ |
| Example 10 | 150 | 0.6 | 10 | $7.7 \times 10^{-6}$ |
| Example 11 | 100 | 0.5 | 10 | $1.8 \times 10^{-3}$ |
| Example 12 | 180 | 0.5 | 10 | $3.3 \times 10^{-4}$ |
| Example 13 | 340 | 0.7 | 10 | $3.4 \times 10^{-6}$ |
| Example 14 | 315 | 0.6 | 10 | $1.0 \times 10^{0}$ |
| Example 15 | 350 | 0.7 | 10 | $7.2 \times 10^{-3}$ |
| Example 16 | 330 | 0.6 | 8 | $9.2 \times 10^{-3}$ |
| Example 17 | 280 | 1.6 | 20 | $2.7 \times 10^{-3}$ |
| Example 18 | 520 | 0.8 | 25 | $3.3 \times 10^{-3}$ |
| Example 19 | 480 | 0.7 | 25 | $6.7 \times 10^{-3}$ |
| Example 20 | 410 | 0.5 | 4 | $2.4 \times 10^{-3}$ |
| Comparative Example 1 | 70 | 0.2 | 10 | $1.0 \times 10^{-9}$ |
| Comparative Example 2 | 50 | 0.2 | 5 | $2.6 \times 10^{-3}$ |
| Comparative Example 3 | 370 | 1.8 | 35 | $1.6 \times 10^{-8}$ |

As can be seen from Table 1, in Examples 1 to 20, each of the porous silicon oxycarbide composite materials had a BET specific surface area of 100 $m^2$/g or more, a pore volume of 0.5 $cm^3$/g or more, a pore size of 2 to 200 nm, and an electrical conductivity of $1.0 \times 10^{-6}$ S/cm or more. From the above results, it was found that a porous silicon oxycarbide composite material having both large BET specific surface area and large electrical conductivity was obtained.

On the other hand, in Comparative Example 1, the porous silicon oxycarbide had a BET specific surface area of 70 $m^2$/g, a pore volume of 0.2 $cm^3$/g, and a pore size of 10 nm. Further, the porous silicon oxycarbide had an electrical conductivity of $1.0 \times 10^{-9}$ S/cm. From the above, it was found that when synthesis of a porous silicon oxycarbide precursor with a sol-gel reaction was not performed, both the BET specific surface area and the electrical conductivity were even smaller than those in each of Examples 1 to 20.

In Comparative Example 2, the porous silicon oxycarbide composite material had a BET specific surface area of 50 $m^2$/g, a pore volume of 0.2 $cm^3$/g, and a pore size of 5 nm. Further, the porous silicon oxycarbide composite material had an electrical conductivity of $2.6 \times 10^{-3}$ S/cm. From the above, it was found that when urea as a pH adjustor was not used, the BET specific surface area was even smaller than that in each of Examples 1 to 20.

In Comparative Example 3, the porous silicon oxycarbide composite material had a BET specific surface area of 370

$m^2/g$, a pore volume of 1.8 $cm^3/g$, and a pore size of 35 nm. Further, the porous silicon oxycarbide composite material had an electrical conductivity of $1.6 \times 10^{-8}$ S/cm. From the above, it was found that when the amount of the ketjen black used was much smaller than that in Example 1, the electrical conductivity was even smaller than that in each of Examples 1 to 20.

Example 21

Figure 4:
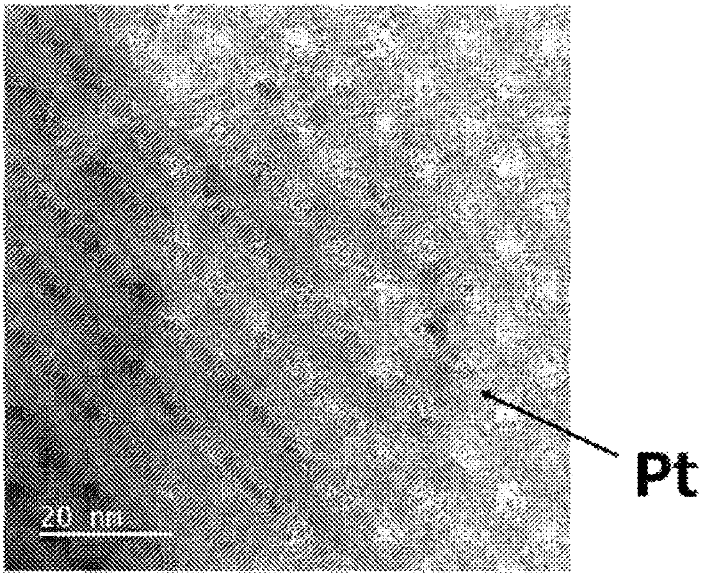
FIG. 4 is a transmission electron microscope image of the porous silicon oxycarbide composite material having platinum particles supported thereon (catalyst A) in Example 21.

Preparation of a Catalyst Containing a Noble Metal 0.43 g of hexachloroplatinic acid hexahydrate was dissolved in 60 mL of ultrapure water, and 3.1 g of sodium hydrogensulfite was added to the resultant solution to cause a reduction reaction to proceed, and then 280 mL of ultrapure water was added to dilute the reaction mixture. Then, a 5% aqueous solution of sodium hydroxide was added, and, while adjusting the pH to about 5, 35% hydrogen peroxide (24 mL) was dropwise added to obtain a dispersion containing platinum colloid. Subsequently, a colloidal dispersion was fractionated in such an amount that the amount of the platinum supported on the carrier became 15% of the total mass including the carrier, and 0.4 g of the porous silicon oxycarbide composite material synthesized in Example 1 was added as a carrier to the dispersion and mixed at 90° C. for 3 hours. After cooling, the resultant mixture was subjected to solid-liquid separation, and the obtained powder was well cleaned with ultrapure water for removing chloride ions from the powder, and then dried in air at 60° C. for 12 hours, obtaining a catalyst A having platinum supported on the porous silicon oxycarbide composite material carrier. A transmission electron microscope image of the catalyst A is shown in FIG. 4. It was found that the platinum particles having a particle diameter of about 5 nm were supported on the carrier.

Preparation of an Electrode

A glassy carbon (GC) electrode having a diameter of 5 mm was polished using a lapping film and an alumina paste, and then subjected to ultrasonic cleaning using ultrapure water. The catalyst A was added to a 60% by volume aqueous ethanol solution and dispersed using an ultrasonic homogenizer. The resultant dispersion was dropwise applied onto the GC disc, and dried at ordinary room temperature for 12 h. After drying, a 5% Nafion (registered trademark) solution was dropwise applied onto the catalyst on the GC disc so that the thickness of the dried film became 50 nm, and dried at ordinary room temperature for 12 h.

[Electrode Evaluation by Electrochemical Measurement]

Electrode evaluation was performed using Electrochemical measurement system HZ-5000, manufactured by Hokuto Denko Corporation. A 0.1 M aqueous solution of perchloric acid was purged with nitrogen gas for 30 minutes, and then, using a reversible hydrogen electrode (RHE) as a reference electrode, cleaning was conducted 50 times in the potential range of 0.05 to 1.2 V at a sweep rate of 150 mV/s. Then, cyclic voltammetry (CV) measurement was conducted as the main measurement in the potential range of 0.05 to 1.2 V at a sweep rate of 100 mV/s. An analysis of the electrochemical active surface area (ECSA) was made using the adsorption wave of hydrogen appearing at 0.4 V or less. Further, for checking stability of the catalyst at 1.0 V or more, sweep was conducted 500 times in the potential range of 1.0 to 1.5 V, and then CV measurement was conducted in the potential range of 0.05 to 1.2 V.

Figure 5:
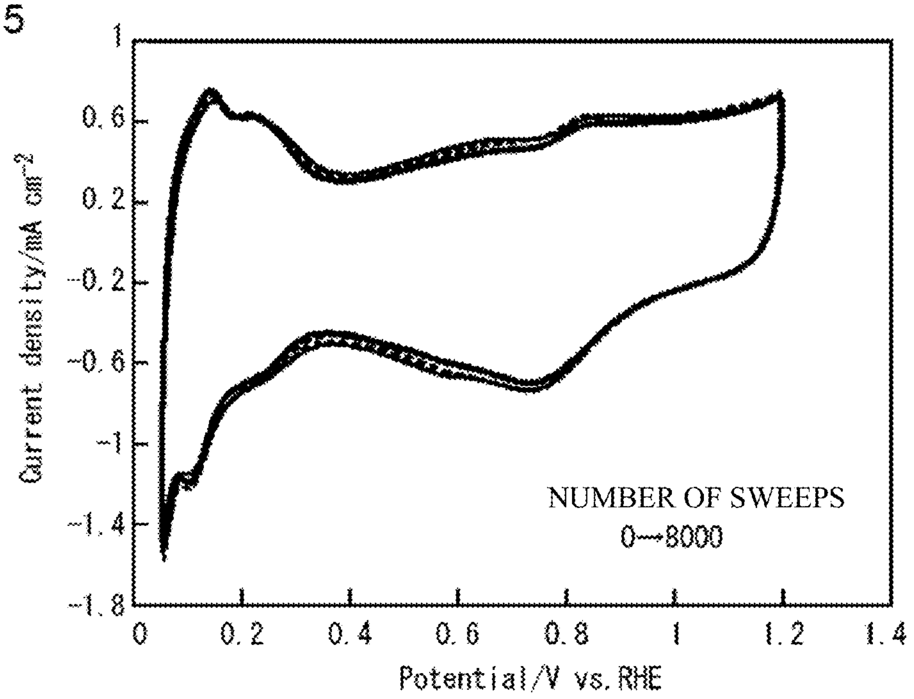
FIG. 5 is a cyclic voltammetry (CV) measurement result with respect to the catalyst A in Example 21.
Figure 6:
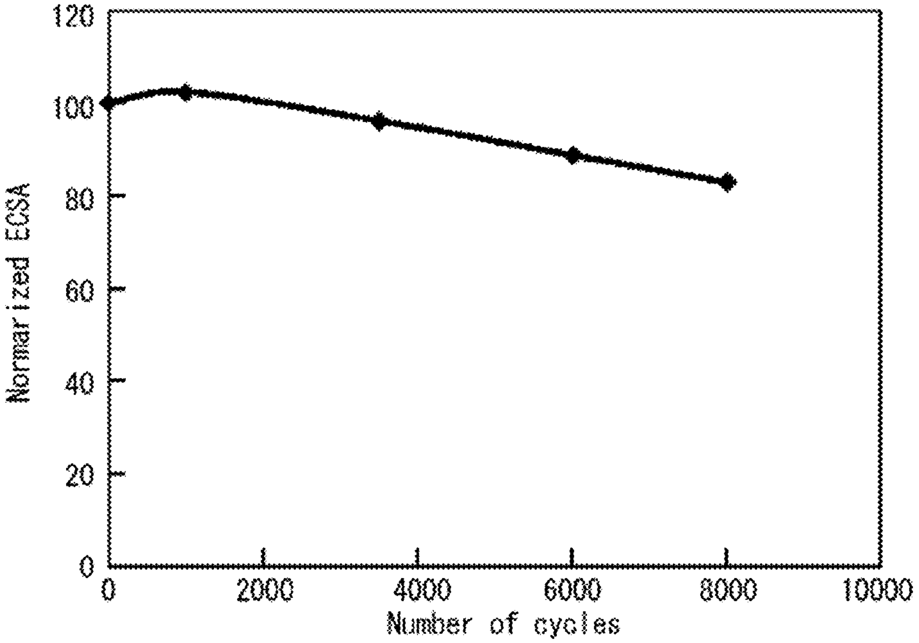
FIG. 6 is a diagram showing a change of the electrochemical active surface area (ECSA) for the number of cycles of the CV measurement with respect to the catalyst A in Example 21.

The above-mentioned procedure for measurement was taken as one set, and 10 or more sets (sweep of 5,000 or more cycles) were performed. The CV measurement result with respect to the catalyst A is shown in FIG. 5. The current value was constant in each cycle of the measurement. FIG. 6 shows a change of the ECSA for the number of cycles of the measurement. From the result of the evaluation in which the number of cycles is up to 8,000, it was found that a reduction of the ECSA was as small as about 20% of the initial value, which indicates that deterioration of the catalyst A was slight and the catalyst A had high potential stability.

Comparative Example 4

Preparation of a catalyst containing a noble metal (preparation of a catalyst B), preparation of an electrode, and electrode evaluation by electrochemical measurement were conducted in substantially the same manner as in Example 21 except that, instead of 0.4 g of the porous silicon oxycarbide composite material synthesized in Example 1 as a carrier, 0.4 g of ketjen black was used as a carrier.

Figure 7:
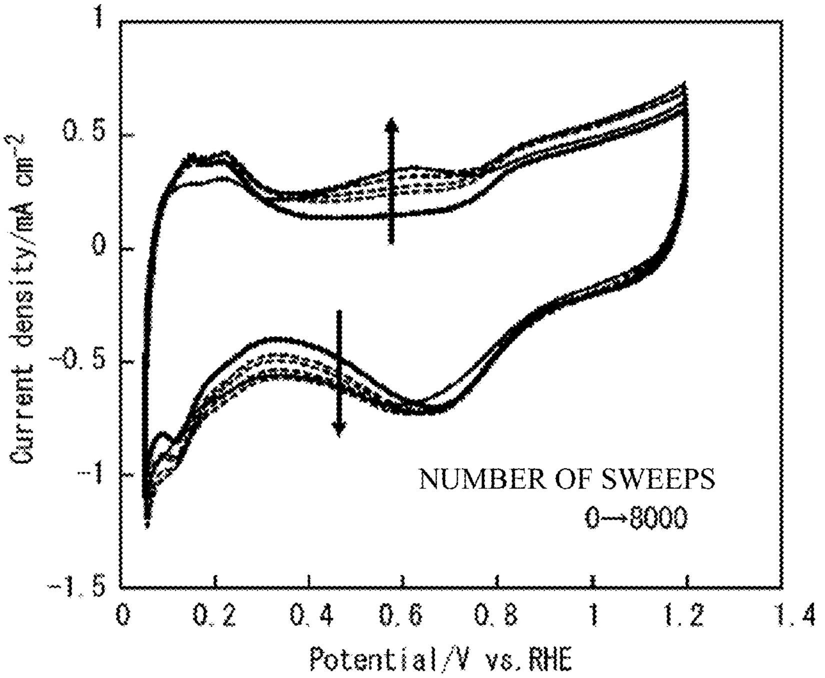
FIG. 7 is a CV measurement result with respect to the catalyst B in Comparative Example 4.
Figure 8:
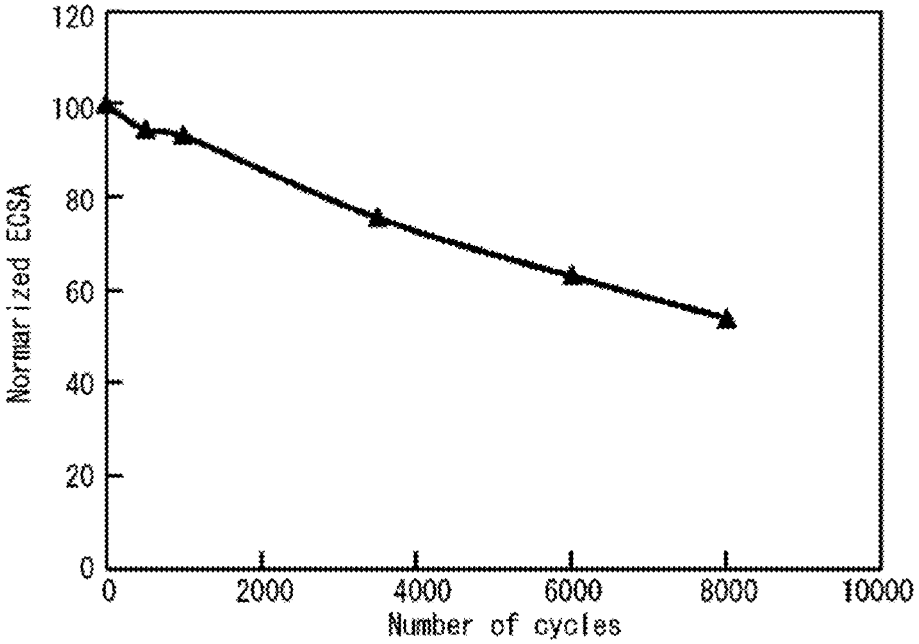
FIG. 8 is a diagram showing a change of the ECSA for the number of cycles of the CV measurement with respect to the catalyst B in Comparative Example 4.

The CV measurement result with respect to the catalyst B is shown in FIG. 7. According to the sweep of potential, the current value around 0.2 to 0.6 V was increased, and further an oxidation-reduction peak of a quinone group caused due to deterioration of carbon appeared at around 0.6 V. FIG. 8 shows a change of the ECSA for the number of cycles of the measurement. From the result of the evaluation in which the number of cycles is up to 8,000, it was found that the ECSA was reduced to about 50% of the initial value, which indicates that the catalyst B using a carbon material as a carrier had poor high potential stability and had poor durability, as compared to the results of the catalyst A shown in Example 21.

INDUSTRIAL APPLICABILITY

The porous silicon oxycarbide composite material of the present embodiment has both large BET specific surface area and high electrical conductivity, and therefore is advantageously used as an electrode material which is used in a catalyst layer for an electrode for use in a fuel cell.

The invention claimed is:

1. A porous silicon oxycarbide composite material comprising:

a porous silicon oxycarbide forming a three-dimensional skeleton structure, and a carbon-containing material supported by the three-dimensional skeleton structure, the porous silicon oxycarbide composite material having a BET specific surface area of 100 $m^2/g$ or more, and having an electrical conductivity of $1.0 \times 10^{-6}$ S/cm or more.

2. The porous silicon oxycarbide composite material according to claim 1, which has a total pore volume of 0.5 $cm^3/g$ or more.

3. The porous silicon oxycarbide composite material according to claim 1, which has a pore size of 2 to 200 nm.

4. The porous silicon oxycarbide composite material according to claim 1, wherein the content of the carbon-containing material in the porous silicon oxycarbide composite material is 2.5 to 50% by mass.

5. The porous silicon oxycarbide composite material according to claim 4, wherein the carbon-containing material comprises one member or two or more members selected from carbon black, a carbon nanofiber, a carbon nanotube, and lowly-crystalline nanocarbon.

6. The porous silicon oxycarbide composite material according to claim 5, wherein the primary particles of the carbon-containing material have an average diameter of 10 to 200 nm.

7. An electrode for use in a fuel cell, the electrode having a layer comprising the porous silicon oxycarbide composite material according to claim 1.

8. A method for producing a porous silicon oxycarbide composite material, comprising the steps of:

(A) adding an organic alkoxysilane to an acidic aqueous solution containing a surfactant and a pH adjustor to cause a sol-gel reaction of the organic alkoxysilane, forming a gel;

(B) cleaning the gel with an alcohol;

(C) drying the cleaned gel to form a porous silicon oxycarbide precursor; and (D) calcining the porous silicon oxycarbide precursor to obtain a porous silicon oxycarbide composite material, wherein, in the step (A), a carbon-containing material or an organic polymer is further added to the acidic aqueous solution to form a gel containing the carbon-containing material or the organic polymer.

9. The method for producing a porous silicon oxycarbide composite material according to claim 8, wherein, in the step (A), the sol-gel reaction is conducted at 25 to 80° C.

10. The method for producing a porous silicon oxycarbide composite material according to claim 8, wherein the organic alkoxysilane is represented by the following formula (1) or (2):

$$R^1\text{—}SiR^2_x(OR^3)_{3-x} \quad (1)$$

wherein $R^1$ is any one group selected from a methyl group, an ethyl group, a vinyl group, and a phenyl group, $R^2$ represents a methyl group, $R^3$ represents a methyl group or an ethyl group, and integer x is 0 or 1, $$R^4\text{—}(SiR^5_y(OR^6)_{3-y})_2 \quad (2)$$

wherein $R^4$ includes any one group selected from a methylene group, an ethylene group, a hexylene group, a vinylene group, a phenylene group, and a biphenylene group, $R^5$ represents a methyl group, $R^6$ represents a methyl group or an ethyl group, and integer y is 0 or 1.

11. The method for producing a porous silicon oxycarbide composite material according to claim 8, wherein the content of the surfactant in the acidic aqueous solution is 0.1 to 50% by mass.

12. The method for producing a porous silicon oxycarbide composite material according to claim 11, wherein the surfactant is a nonionic surfactant and/or a cationic surfactant.

13. The method for producing a porous silicon oxycarbide composite material according to claim 8, wherein the content of the pH adjustor in the acidic aqueous solution is 5 to 50% by mass.

14. The method for producing a porous silicon oxycarbide composite material according to claim 12, wherein the pH adjustor contains any one selected from urea, ammonia, and sodium hydroxide.

15. The method for producing a porous silicon oxycarbide composite material according to claim 8, wherein the mass ratio of the carbon-containing material or organic polymer and the organic alkoxysilane is 2.5 to 50:97.5 to 50.

16. The method for producing a porous silicon oxycarbide composite material according to claim 15, wherein the carbon-containing material comprises one member or two or more members selected from carbon black, a carbon nanofiber, a carbon nanotube, and lowly-crystalline nanocarbon.

17. The method for producing a porous silicon oxycarbide composite material according to claim 16, wherein primary particles of the carbon-containing material have an average diameter of 10 to 200 nm.

18. The method for producing a porous silicon oxycarbide composite material according to claim 15, wherein the organic polymer comprises one member or two or more members selected from a phenolic resin, polystyrene, and polydivinylbenzene.

19. The method for producing a porous silicon oxycarbide composite material according to claim 8, wherein, in the step (B), the surfactant is removed from the acidic aqueous solution, and further water in the acidic aqueous solution is replaced by the alcohol.

20. The method for producing a porous silicon oxycarbide composite material according to claim 8, wherein, in the step (C), the cleaned gel is dried at room temperature under atmospheric pressure.

21. The method for producing a porous silicon oxycarbide composite material according to claim 8, wherein, in the step (D), the porous silicon oxycarbide composite material is calcined at 700 to 1,200° C.

* * * * *